United States Patent
Briand et al.

(10) Patent No.: US 7,194,034 B2
(45) Date of Patent: Mar. 20, 2007

(54) METHOD AND DEVICE FOR DETECTING RELIABILITY OF A FIELD OF MOVEMENT VECTORS

(75) Inventors: Gérard Briand, Ploufragan (FR); Juan Moronta, Rennes (FR); Alain Verdier, Vern sur Seiche (FR)

(73) Assignee: Thomas Licensing, Boulogne-Billancourt (FR)

( * ) Notice: Subject to any disclaimer, the term of this patent is extended or adjusted under 35 U.S.C. 154(b) by 1011 days.

(21) Appl. No.: 10/075,839

(22) Filed: Feb. 13, 2002

(65) Prior Publication Data

US 2002/0141500 A1    Oct. 3, 2002

(30) Foreign Application Priority Data

Feb. 15, 2001   (FR)  ................... 01 02042

(51) Int. Cl.
*H04N 7/12* (2006.01)
(52) U.S. Cl. ................................. 375/240.16
(58) Field of Classification Search ........... 375/240.01, 375/240.12, 240.16, 240.17, 240.24, 240.26, 375/240.27; 348/447, 700, 701; *H04N 7/12*
See application file for complete search history.

(56) References Cited

U.S. PATENT DOCUMENTS

| | | | | |
|---|---|---|---|---|
| 4,864,398 A | * | 9/1989 | Avis et al. | 375/240.17 |
| 5,057,921 A | | 10/1991 | Robert et al. | 358/140 |
| 5,193,001 A | * | 3/1993 | Kerdranvrat | 348/701 |
| 5,546,130 A | * | 8/1996 | Hackett et al. | 348/447 |
| 5,784,114 A | | 7/1998 | Borer et al. | 348/452 |
| 6,462,791 B1 | * | 10/2002 | Zhu | 375/240.27 |

FOREIGN PATENT DOCUMENTS

| | | |
|---|---|---|
| EP | 0648047 A2 | 4/1995 |
| EP | 0903946 A1 | 3/1999 |

OTHER PUBLICATIONS

O. A. Ojo et al., "Robust Motion-Compensated Video Upconversion", IEEE Transactions on Consumer Electronics, IEEE Inc., New York, NY, vol. 43, No. 4, Nov. 1, 1997, pp. 1045-1056.
French Search Report dated: Oct. 25, 2001.

* cited by examiner

*Primary Examiner*—Young Lee
(74) *Attorney, Agent, or Firm*—Joseph J. Laks; Ronald H. Kuroyla; Guy H. Eriksen

(57) ABSTRACT

A method of detecting the reliability of a field of movement vectors of one image in a sequence of video images. The method includes a stage of calculating a stability parameter, Det_Stab(t), for the field. The parameter is based on a comparison (4), over two successive images, of the number of occurrences of the majority vectors of the movement-vectors fields of each of these images. A field is defined as stable if the variation in the number of occurrences lies within a predefined bracket. Reliability (7) is decided on the basis of this stability parameter.

16 Claims, 1 Drawing Sheet

METHOD AND DEVICE FOR DETECTING RELIABILITY OF A FIELD OF MOVEMENT VECTORS

FIELD OF THE INVENTION

The invention relates to a method and a device for detecting the reliability of a field of movement vectors of one image in a sequence of video images. A reliability criterion is calculated and assigned to an image in order to indicate the reliability of the movement-vectors field associated with this image. It can be combined with other reliability parameters which are already known, such as parameters for detection of saturation of the movement-vectors field, for detection of change of scene, etc., so as to enhance the degree of confidence in the resulting parameter.

BACKGROUND OF THE INVENTION

The conversion of standards, or more generally the conversion of frame frequency, usually relies on two types of processes:
  movement estimation, which supplies a movement-vectors field which is faithful to the space/time changes in the objects which constitute the scene,
  interpolation, which can make use of this vector field in order to position the objects correctly in an intermediate frame to be constructed.

Linear or movement-compensated interpolations, which are conventionally applied in frame-frequency conversion, are not always suitable for all the situations encountered in a video sequence. It is sometimes necessary to deal with critical situations which cause difficulty for the estimator or interpolator, by making use of appropriate detection which can invoke a more suitable interpolation configuration.

This is because, in theory, a movement-vectors field is temporally uniform over a video sequence. A movement-vectors field, when it is correct, undergoes very little time-domain variation. A time-domain irregularity is often synonymous with an unreliable movement-vectors field. When an abnormal variation occurs, denoting a movement estimation with a time-domain disturbance, movement-compensated interpolation may give a poor-quality image.

Consequently, when an instability is detected in the time domain, suggesting that the video content is incompatible with movement estimation, it is necessary to opt for a frame-interpolation process other than that making use of the movement-vectors field.

The object of the proposed invention is to resolve such problems, by making it possible to evaluate the reliability of the movement-vectors field.

SUMMARY OF THE INVENTION

The object of the invention is a method of detecting the reliability of a field of movement vectors of one image in a sequence of video images, characterized in that it includes a stage of calculating a stability parameter Det_Stab(t) for the field, on the basis of a comparison, over two successive images, of the number of occurrences of the majority vectors of the movement-vectors fields of each of these images, a field being defined as stable if the variation in the number of occurrences lies within a predefined bracket, and a stage of deciding on reliability on the basis of this stability parameter.

According to one enhancement, the method is characterized in that it also includes a stage of calculating a disturbance parameter Det_Dist(t) for the field, on the basis of a comparison, over two successive images, of the number of occurrences of the movement vector corresponding to the majority vector of one of the two images, a field being defined as not disturbed if the variation in the number of occurrences lies within a predefined bracket, and in that the decision stage is also based on this disturbance parameter.

According to one variant, the method is characterized in that it also includes a stage of calculating a disturbance parameter Det_Dist(t) for the field, a field being defined as not disturbed if the variation in the number of occurrences of the zero vector in the movement-vectors field, between two successive images, lies within a predefined bracket, and in that the decision stage is also based on this disturbance parameter.

According to one enhancement, the method is characterized in that it includes a stage of calculating, for an image (t), a time-domain stability state Stabl_Stat(t) on the basis of the stability parameters Det_Stab(t) for this image and of P−1 preceding images, a state being declared as stable if a minimum number Q of stable fields is detected among these P images, P and Q being integers such that P>Q, and in that the decision stage is also based on this stability state.

According to one enhancement, the method is characterized in that it includes, for an image (t), a stage of calculating a disturbance state Dist_Stat(t), on the basis of the disturbance parameters Det_Dist (t) for this image and for the M−1 preceding images, a state being declared to be disturbed or not disturbed depending on whether a minimum number L of non-disturbed fields are detected among these M images, M and L being integers such that M>L, and in that the decision stage is also based on this disturbance state.

According to one enhancement, the method is characterized in that it also includes a stage of calculating a stability parameter Det_Stab(t) for the field, on the basis of a comparison, over two successive images, of the number of occurrences of the majority vectors of the movement-vectors fields of each of these images, a field being defined as stable if the variation in the number of occurrences lies within a predefined bracket, and in that a vector field is declared to be reliable if a stable field and a non-disturbed state are detected.

According to one enhancement, the method is characterized in that it also includes, for an image (t), a stage of calculating a disturbance parameter Det_Dist(t) for the field, on the basis of a comparison, over two successive images, of the number of occurrences of the movement vector corresponding to the majority vector of one of the two images, a field being defined as not disturbed if the variation in the number of occurrences lies within a predefined bracket, as well as a stage of calculating a disturbance state Dist_Stat(t) on the basis of the disturbance parameters Det_Dist(t) for this image and for the M−1 preceding images, a state being declared as disturbed or not disturbed depending on whether a minimum number Q of non-disturbed fields are detected or not detected among these M images, M and Q being strictly positive integers, and in that a vector field is declared to be reliable if a stable field, a disturbed and stable state are detected.

A stability parameter associated with a previously estimated movement-vectors field, this parameter being global to the frame, makes it possible to evaluate the reliability of the movement-vectors field. A disturbance parameter for the movement-vectors field also allows such an evaluation. These parameters can be made use of in order respectively to detect a stability state on the basis of the time-domain stability of the field and a disturbance state which are calculated on the basis of a historical record of the preceding parameters. These parameters may be combined together and/or with these states in order to better evaluate the reliability of the movement-vectors field.

This reliability evaluation may lead to a particular method of using this movement-vectors field. When the reliability is declared to be insufficient, a linear-type interpolation not using the movement information, for example a frame repetition, can be employed in place of movement-compensated interpolation. For example, in image-frequency conversion, when a zero reliability accompanies the movement-vectors field, movement-compensated interpolation is avoided. The image quality is thus enhanced.

BRIEF DESCRIPTION OF THE DRAWING

Other features and advantages of the invention will emerge clearly in the following description given by way of non-limiting example, and given with respect to FIG. 1 which represents a block diagram of the method of calculating a reliability criterion for the movement-vectors field.

DETAILED DESCRIPTION OF PREFERRED EMBODIMENTS

Figure 1:
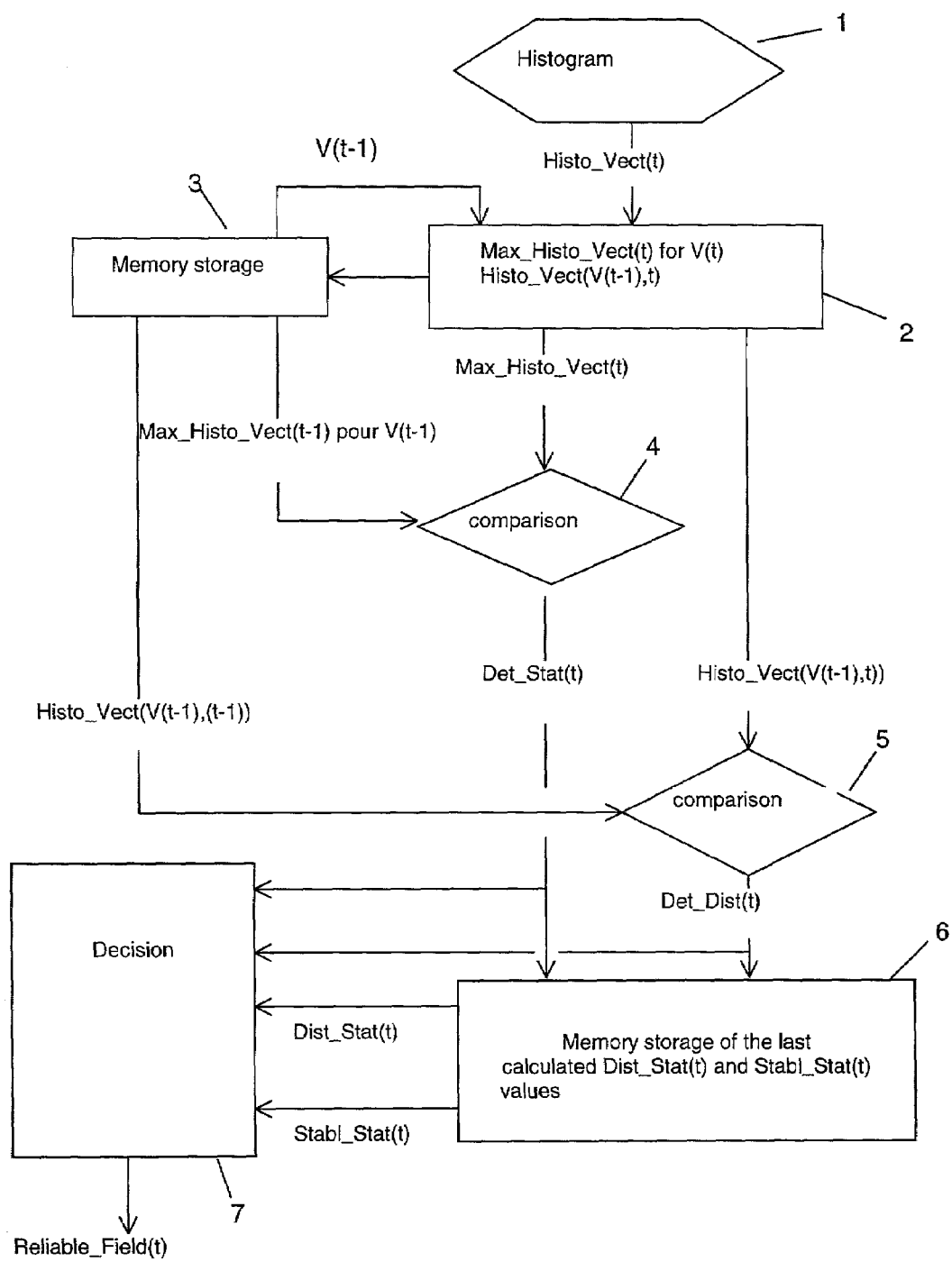

The detection of a break in regularity of the movement-vectors field is carried out by way of an analysis of the histogram of the estimated vectors.

The movement-vectors field processed may be to any definition. However, the analysis will be all the more effective the more extensive the definition of this field. Ideally, it will reach a definition of a vector per pixel. It will originate, for example, from a movement estimator of recursive-PEL type. This vector field is assumed to relate to the estimated movements between two consecutive images or frames corresponding to the instants t and t−1 and serves for interpolation of an intermediate image or frame situated between these instants t and t−1.

In the text, the word "images" will be intended to designate any type of presentation. These may be odd or even frames or images reconstituted from the odd and even frame in the case of interlaced scanning, images from progressive scanning, etc. Likewise, successive or consecutive images will designate successive frames of the same parity or of any arbitrary parity, or else successive images of a progressive scanning or reconstituted images. In fact, it is the calculation of the movement-vectors fields, which can be carried out in different ways, for example by calculating the movement between two successive frames of the same parity or else between two reconstituted images, which defines the terms used.

The analysis is carried out on the basis of the horizontal component of the vectors, this component containing information which is richer and more representative of the movements, by comparison with the vertical component. Only values lying between −32 and +31 are considered, although the estimator can supply vector values going beyond these limits.

A histogram of the resultant vector field is derived, keeping the precision of these vectors equal to unity, i.e. a resolution of W/720 for a screen width W and a horizontal definition of the image of 720 pixels. The values on the x-axis of this histogram are therefore spread out from −32 to +31 per step of one unit. This step could be coarser, but at the risk of reducing the performance of the algorithm. The y-axis represents the number of occurrences.

The histogram is defined by the function:
Histo_Vect (n, t)

which represents the number of vectors of value n in the vector field associated with the frame at the instant t, n varying from −N to +(N−1), N having the value 32 in the experiment.

In a general way, the value Histo_Vect(0, t) which therefore represents the frequency of appearance of the zero vector for the frame at the instant t, corresponds to the peak of the histogram in the case of fixed or slightly moving images. The detection of the time-domain irregularity of the movement-vectors field is therefore carried out, in this first embodiment example, on the basis of the analysis of the value of the histogram for the zero vector.

The reliability detection is done in several stages:
calculation of a disturbance-detection parameter Det_Dist(t)
calculation of a stability-detection parameter Det_Stab(t)
calculation of a disturbed-state parameter Dist_Stat(t) on the basis of the disturbance-detection parameter,
calculation of a stable-state parameter Stabl_Stat(t) on the basis of the stability-detection parameter,
derivation of a variable Reliable_Field defining the reliability of the vector field on the basis of the preceding parameters.

A parameter Det_Dist(t) for detection of a time-domain disturbance on the movement-vectors fields, is first of all calculated for each frame.

It is derived by comparison of the histogram of the vectors of the current frame (t) with that of the preceding frame (t−1). As indicated above, only the value of the histogram for the zero-vector value is used here. The test is as follows:
If:

$$K1 \times \text{Histo\_Vect}(0, t-1) > \text{Histo\_Vect}(0, t) > \frac{1}{K1} \times \text{Histo\_Vect}(0, t-1)$$

then Det_Dist(t)=0
else Det_Dist(t)=1
with constant K1, which is a positive rational number greater than unity.

A value chosen by experiment is K1=13/10.

When the number of vectors at the value zero changes from one frame (t−1) to the next one t in such a way as to leave a bracket, defined by K1, around this number for the frame (t−1), then disturbance has been detected and the parameter Det_Dist(t) takes the value 1.

This disturbance-detection parameter, calculated for each frame, is stored in memory. Another disturbed-state parameter, Dist_Stat(t), is derived on the basis of the historical record of the detection, more precisely on the basis of the disturbance-detection parameter of the current frame and for the M−1 preceding frames:
If $$\sum_{m=0}^{m=M-1} \text{Det\_Dist}(t-m) \geq L$$

then Dist_Stat(t)=1
else Dist_Stat(t)=0;
M and L being positive integers such that M>L.

In our experiment, the values L and M were set respectively at 4 and 16.

Thus, if there are at least L frames out of the last M frames which have a disturbance-detection parameter at one, a disturbed state is declared for the last frame.

A stability-detection parameter Det_Stab is also calculated for the vector field, still by comparing the histograms of the vectors of the current $$\text{Max\_Histo\_Vect}(t) = \overset{n=N-1}{\text{Max}} \{Histo\_Vect(n.t)\}.n \neq -1.0.+1$$

frame and for the preceding frame. However, the occurrence value used here is not that situated in the immediate vicinity of zero; this vicinity is, moreover, completely excluded. It is the value occurring most often which is taken into account. Before carrying on with the test, a search for the actual peak of the histogram, the majority value of the vector field, is therefore carried out:

Max_Histo_Vect(t) designates the maximum of the histogram, that is to say the most prevalent occurrence in the histogram relating to the frame at the instant t, the occurrence values relating to the vectors −1, 0 and 1 being excluded.

The parameter Det_Stab is then calculated:
if $$\text{Max\_Histo\_Vect}(t-1) \times \frac{1}{K2} < \text{Max\_Histo\_Vect}(t) < \text{Max\_Histo\_Vect}(t-1) \times K2$$

then Det_Stab 1
else Det_Stab 0

K2 is a positive rational number greater than one. It is set at 13/10 in our experiment.

The test is carried out here on the number of occurrences corresponding to the maximum of occurrences, the occurrences relating to the values of vectors close to zero not being taken into account. If this number of occurrences, corresponding to the maximum of occurrences relating to image t, whatever the value to which this maximum corresponds, is close to the number of occurrences corresponding to the maximum of occurrences relating to the image t−1, that is to say lies in a bracket defined by K2 and this maximum, then the vector field is assumed to be stable and the parameter Det_Stab is set at 1. It is therefore necessary for there to be little variation in the number of occurrences. What is considered here is not the value of the movement vector but the number of vectors, that is to say of pixels, corresponding to the same value, which makes it possible to get round slow variations in vector values occurring, for example, during acceleration, camera tracking, etc.

This stability-detection parameter, calculated for each frame, is stored in memory. Another stable-state parameter, Stabl_Stat(t), is derived, as before, on the basis of the historical record of the stability detection, more precisely on the current frame and the P−1 preceding frames:

If $$\sum_{p=0}^{p=(P-1)} Det\_Stab(t-p) \geq Q$$

then Stabl_Stat(t)=1
else Stabl_Stat(t)=0;

P and Q being positive integers such that P>Q, set respectively at 16 and 4 in our experiment.

A stable state is thus declared only if at least Q frames from among the last P frames have a stability-detection parameter equal to 1.

In summary, if the value of the peak of the histogram undergoes slight variations during a certain number of frames, with some frames possibly being ignored, then the field is declared to be stable.

The following stage carries out the calculation of the variable Reliable_Field.

This calculation takes account of the historical record relating to the stability and the disturbance of the vector field, and of the detection measurements on the current frame at the instant t.

If a movement-vectors field is detected to be stable at the frame-t instant, and if the number of preceding fields detected as disturbed is low, then the field is declared Reliable_Field.

If the historical record gives both a high number of disturbances and of stabilities, while having detected a stable field for the frame at the instant t, then the field for the frame at the instant t is declared Reliable_Field. It is assumed, in effect, in this case, that the historical record is unreliable since it is contradictory.

If, at the instant t, a disturbance is detected with a heavily disturbed historical record, and if the stability condition at this same instant is not satisfied, then the field is declared unreliable and the variable Reliable_Field is set to false.

Which gives, on the basis of the calculated parameters:
If Det_Stab(t)=1 and Dist_Stat(t)=0
then Reliable_Field(t)=1
If Det_Stab(t)=1 and Dist_Stat(t)=1 and Stabl_Stat(t)=1
then Reliable_Field(t)=1
If Det_Stab(t)=0 and Dist_Stat(t)=1 and Det_Dist(t)=1
then Reliable_Field(t)=0

If none of the preceding 3 conditions is satisfied, then the reliability state of the preceding frame is retained:
Reliable_Field(t)=Reliable_Field(t−1)

In effect, all the other detection situations are regarded as ambiguous and unreliable, and therefore do not give rise to any change of state of the variable Reliable_Field. The initial value of this variable upon starting of the system may be 0 or 1 arbitrarily.

Hence, the purpose of the detection is to cause the parameter "Reliable_Field" to vary on the basis of the disturbances encountered. It is a question of analysing the disturbances detected via a time-domain variation in the occurrences relating to the zero vector. A substantial time-domain variation contributes to the changing-over of the variable Reliable_Field to 0. It is also a question of analysis of the stability detected by a slight or zero time-domain variation in the occurrences relating to the majority vector of one of the histograms, while excluding the vector values close to zero. If there is stability, then the variable Reliable_Field passes back to 1, which remains the most frequent state.

Movement estimators give higher performance in estimating movement vectors close to zero. It is therefore possible to place more confidence in vectors close to zero, and this is the reason why the zero value is chosen in the histogram for declaring instability. If this vector equal to zero is unstable in the time domain, the probability that an instability is involved is very high and, in any event, higher than that which could be declared on the basis of the value occurring most often, if it is other than zero.

Needless to say, it is entirely possible to make use of the real peak of the histogram for calculating the disturbance parameter Det_Dist(t), and this is the subject of the variant described below in connection with FIG. 1.

FIG. 1 represents a flow chart describing a method of evaluating the reliability of a movement-vectors field. In this variant, the calculation of the parameter Det_Dist(t) for the frame t is carried out not on the basis of the occurrences relating to the zero value of the movement vector, but on the basis of the occurrences relating to the value V(t−1) corresponding to the maximum occurrence for the frame t−1.

At the stage referenced 1 in the figure, a histogram Histo_Vect(t) is calculated, representing, on the x-axis, the values of the horizontal component of the movement vectors relating to the current frame t and, on the y-axis, the number of occurrences for each of these values.

Stage 2 takes into account the maximum occurrence Max_Histo_Vect(t) corresponding to a value on the x-axis which will be called V(t).

Stage 2 receives, from a memory-storage stage 3, the value of the vector, in fact its horizontal component, V(t−1), for which the histogram of the frame t−1 was a maximum. It calculates the occurrence relating to this value V(t−1), Histo_Vect(V(t−1),t), for the histogram corresponding to the frame t.

These values of V(t), Max_Histo_Vect(t) and Histo_Vect(V(t−1),t) are forwarded to stage 3 which stores them in memory for each frame.

The Max_Histo_Vect(t) values originating from stage 2 and Max_Histo_Vect(t−1) originating from stage 3 are forwarded to stage 4. This stage carries out a comparison between these two values in order to calculate the parameter Det_Stab(t).

If $$\text{Max\_Histo\_Vect}(t-1) \times \frac{1}{K2} < \text{Max\_Histo\_Vect}(t) < \text{Max\_Histo\_Vect}(t-1) \times K2$$

then Det_Stab=1
else Det_Stab=0;
with K2 being a constant, which is a positive rational number greater than unity.

The values Histo_Vect(V(t−1),t) originating from stage 2 and Histo_Vect(V(t−1),t−1) originating from stage 3 are forwarded to stage 5. This stage carries out a comparison between these two values in order to calculate the parameter Det_Dist(t).

If $$K1 \times \text{Histo\_Vect}(V(t-1), t-1) > \text{Histo\_Vect}(V(t-1), t) > \frac{1}{K1} \times \text{Histo\_Vect}(V(t-1), t-1)$$

then Det_Dist(t)=0
else Det_Dist(t)=1;
with K1 being a constant which is a positive rational number greater than unity.

The information Det_Dist(t) and Det_Stab(t) originating respectively from stage 5 and from stage 4 is forwarded to stage 6 which stores the last M and P values received respectively relating to the last M and P frames in order to calculate the variables Dist_Stat(t) and Stabl_Stat(t) such that:

If $$\sum_{m=0}^{m=M-1} \text{Det\_Dist}(t-m) \geq L$$

then Dist_Stat(t)=1
else Dist_Stat(t)=0;
If $$\sum_{p=0}^{p=(P-1)} \text{Det\_Stab}(t-p) \geq Q$$

then Stabl_Stat(t)=1
else Stabl_Stat(t)=0;
M, P, L and Q being integer values such that M>L and P>Q.

Finally, the values Det_Stab(t), Det_Dist(t) originating from stages 4 and 5, the values Stabl_Stat(t) and Dist_Stat(t) originating from stage 6 are forwarded to stage 7 which supplies, as output, an information item Reliable_Field (t), as indicated above:

If Det_Stab(t)=1 and Dist_Stat(t)=0 then Reliable_Field(t)=1
If Det_Stab(t)=1 and Dist_Stat(t)=1 and Stabl_Stat(t)=1 then Reliable_Field(t)=1
If Det_Stab(t)=0 and Dist_Stat(t)=1 and Det_Dist(t)=1 then Reliable_Field(t)=0
If none of the 3 conditions above is satisfied, then the reliability state of the previous frame is retained:
Reliable_Field(t)=Reliable_Field(t−1)

The method described in the first instance made use of the number of occurrences of the zero vectors. An enhancement of this method consists in adding two optional conditions for making use of the zero vectors.

The two conditions are:
that the number of occurrences relating to the zero vector is actually a local peak, that is to say that:
Histo_Vect(0,t)>Histo_Vect(+1,t)
and
Histo_Vect(0,t)>Histo_Vect(−1,t)
that this number of occurrences is higher than a threshold, that is to say that:
Histo_Vect(0,t)>S1
with S1 set at a predetermined value.

This threshold has been chosen experimentally at ⅛ of the number of pixels of the vector field.

The enhancement consists, in the case in which these conditions are not fulfilled, in making comparisons not on the basis of the zero vector but on the basis of the vector corresponding to the maximum number of occurrences, as indicated in the variant which has just been described in connection with FIG. 1.

The invention can be applied to the conversion of standards, for example between 50 and 60 Hz. It particularly makes it possible to avoid defects inherent in movement estimation when it proves to be risky or even impossible: photographic flash, stroboscopic effects, complex special effects, intra-image mixing of video and film contents, etc.

Other applications employing frame-rate conversion may make use of this method, for example the high-frequency conversion for a television set, the video interface between TV and PC systems.

This reliability criterion associated with vector fields may also be made use of in processing operations such as coding, for example by making it possible to influence the decision relating to the choice of the coding modes.

The algorithm is all the more effective the denser and the more physical the original movement-vectors field is, that is to say the more representative it is of the real movements. However it can also be applied to fields of vectors in blocks originating from a movement estimator of the type known as a block-matching type.

The invention therefore relates to movement estimators, frequency converters, standard converters, video coders employing algorithms as described above.

A device according to the invention includes means for comparing, over two successive images, the number of occurrences of the majority vectors of the movement-vectors fields of each of these images, means for calculating a stability parameter Det_Stab(t) for the field, on the basis of the comparison result, a field being defined as stable if the variation in the number of occurrences lies within a predefined bracket, and means for deciding on reliability on the basis of this stability parameter.

According to one enhancement, such a device also includes means for comparing, over two successive images, the number of occurrences of the movement vector corresponding to the majority vector of one of the two images, means for calculating a disturbance parameter Det_Dist(t) for the field, on the basis of the comparison results, a field being defined as not disturbed if the variation in the number of occurrences lies within a predefined bracket, the decision means receiving the stability parameter and the disturbance parameter.

According to another enhancement, the device includes means for calculating stability states and disturbance states on the basis of means for memory-storage of the stability and disturbance parameters for the preceding images, the decision means receiving this information in order to declare a field reliable or unreliable.

According to another enhancement of the invention, the comparisons are carried out not on the maximum values of histograms or values of histograms corresponding to the zero vector, but on the sum of histograms values around the maximum value or of the zero value. For example, the comparison which is the subject of stage 4 is made not on the value Max_Histo_Vect(t−1) but on the sum corresponding to this value and to the two histograms values which bracket it. In the case of the test of Det_Dist(t), the sum is formed, for example, on the values of the histograms corresponding to the zero vector and to the two adjacent vectors. Naturally, more than two adjacent vectors could be selected for these additions. This solution makes it possible to get round distributions of histogram values around peaks which can vary slightly from one frame to the other because of the inaccuracy in the movement estimation.

In the examples described, only the horizontal component of the movement vector is used for the analysis of the vector fields; this is because it is this component which generally undergoes the greatest variation, and it is sufficiently representative of the actual movement. This is for the sake of simplicity, and it can therefore certainly be envisaged, without departing from the scope of the invention, that the two components be made use of or else the vertical component alone in a given context. The same goes for the maximum amplitudes of the vectors processed, which may be extended.

The reliability criterion thus calculated may be combined with other known criteria, for example a criterion of the saturation of the movement-vectors field or a criterion of the detection of change of scenes. The combination of these criteria makes it possible to obtain even more effective detection of the reliability of the movement-vectors field.

What is claimed is:

1. Method of detecting the reliability of a field of movement vectors of one image in a sequence of video images, characterized in that it includes a stage of calculating a stability parameter Det_Stab(t) for the field, on the basis of a comparison (4), over two successive images, of the number of occurrences of the majority vectors of the movement-vectors fields of each of these images, a field being defined as stable if the variation in the number of occurrences lies within a predefined bracket, and a stage of deciding on reliability (7) on the basis of this stability parameter.

2. Method according to claim 1, characterized in that it also includes a stage of calculating a disturbance parameter Det_Dist(t) for the field, on the basis of a comparison (5), over two successive images, of the number of occurrences of the movement vector corresponding to the majority vector of one of the two images (2, 3), a field being defined as not disturbed if the variation in the number of occurrences lies within a predefined bracket, and in that the decision stage (7) is also based on this disturbance parameter.

3. Method according to claim 1, characterized in that it also includes a stage of calculating a disturbance parameter Det_Dist(t) for the field, a field being defined as not disturbed if the variation in the number of occurrences of the zero vector in the movement-vectors field, between two successive images, lies within a predefined bracket, and in that the decision stage (7) is also based on this disturbance parameter.

4. Method according to claim 1, characterized in that it includes a stage of calculating, for an image (t), a time-domain stability state Stabl_Stat(t) (6) on the basis of the stability parameters Det_Stab(t) for this image and of P−1 preceding images (4), a state being declared as stable if a minimum number Q of stable fields is detected among these P images, P and Q being integers such that P>Q, and in that the decision stage (7) is also based on this stability state.

5. Method according to claim 2, characterized in that it includes, for an image (t), a stage of calculating a disturbance state Dist_Stat(t) (6), on the basis of the disturbance parameters Det_Dist (t) for this image and for M−1 preceding images (5), a state being declared to be disturbed or not disturbed depending on whether a minimum number L of non-disturbed fields are detected among these M images, M and L being integers such that M>L, and in that the decision stage (7) is also based on this disturbance state.

6. Method according to claim 5, characterized in that it also includes a stage of calculating a stability parameter Det_Stab(t) for the field, on the basis of a comparison (4), over two successive images, of the number of occurrences of the majority vectors of the movement-vectors fields of each of these images, a field being defined as stable if the variation in the number of occurrences lies within a predefined bracket, and in that a vector field is declared to be reliable if a stable field and a non-disturbed state are detected.

7. Method according to claim 4, characterized in that it also includes, for an image (t), a stage of calculating a disturbance parameter Det_Dist(t) for the field, on the basis of a comparison (5), over two successive images, of the number of occurrences of the movement vector corresponding to the majority vector of one of the two images (2, 3), a field being defined as not disturbed if the variation in the number of occurrences lies within a predefined bracket, as well as a stage of calculating a disturbance state Dist_Stat(t) (6) on the basis of the disturbance parameters Det_Dist(t) for this image and for M−1 preceding images (5), a state being declared as disturbed or not disturbed depending on whether a minimum number Q of non-disturbed fields are detected or not detected among these M images, M and Q being strictly positive integers, and in that a vector field is declared to be reliable if a stable field, a disturbed and stable state are detected.

8. Method according to claim 1 characterized in that the occurrences of the vectors are relative to the value of the horizontal component of these vectors.

9. Method according to claim 1, characterized in that the decision stage (7) also takes into account a parameter for the detection of saturation of the movement-vectors field.

10. Method according to claim 1, characterized in that the decision stage (7) also takes into account a parameter for detection of a change of scene in the video sequence.

11. Device for detecting reliability of a movement-vector field of one image from an image sequence, characterized in that it includes:
- means (4) for comparing, over two successive images, the number of occurrences of the majority vectors of the movement-vectors fields of each of these images,
- means for calculating a stability parameter Det_Stab(t) for the field, on the basis of the comparison result, a field being defined as stable if the variation in the number of occurrences lies within a predefined bracket,
- and means for deciding on reliability (7) on the basis of this stability parameter.

12. Device according to claim 11, characterized in that it also includes:
- means (4) for comparing, over two successive images, the number of occurrences of the movement vector corresponding to the majority vector of one of the two images,
- means for calculating a disturbance parameter Det_Dist(t) for the field, a field being defined as not disturbed if the variation in the number of occurrences lies within a predefined bracket,
- the means for deciding on reliability (7) also taking this disturbance parameter into account.

13. Frequency converter, characterized in that it comprises a device according to claim 11.

14. Video coder, characterized in that it comprises a detection device according to claim 11.

15. Method according to claim 2 characterized in that the occurrences of the vectors are relative to the value of the horizontal component of these vectors.

16. Method according to claim 3 characterized in that the occurrences of the vectors are relative to the value of the horizontal component of these vectors.

* * * * *